G. H. NYE.
Preparing Hay for Baling.
No. 45,853.  Patented Jan. 10, 1865.
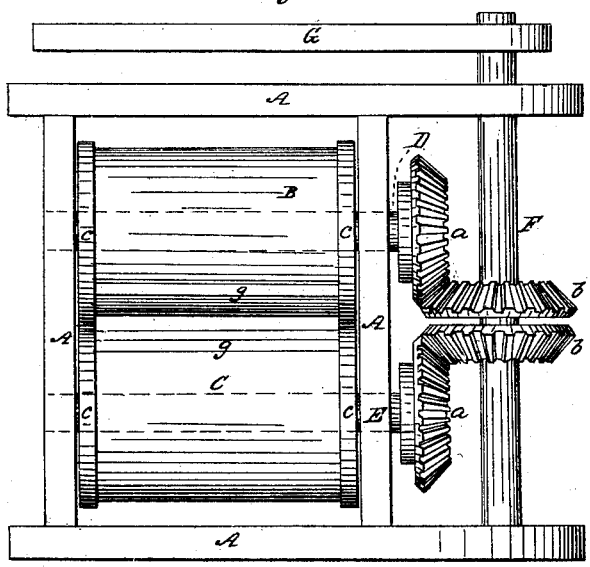
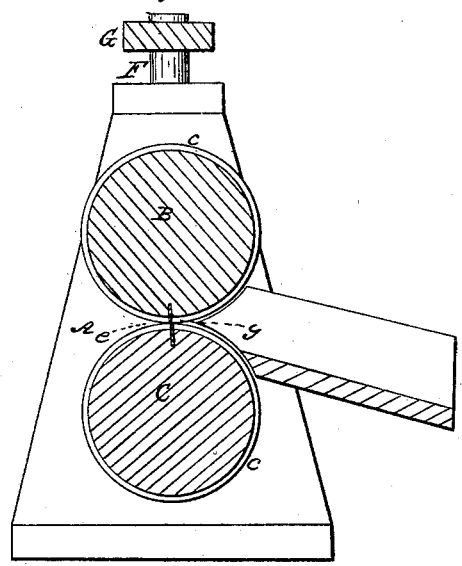
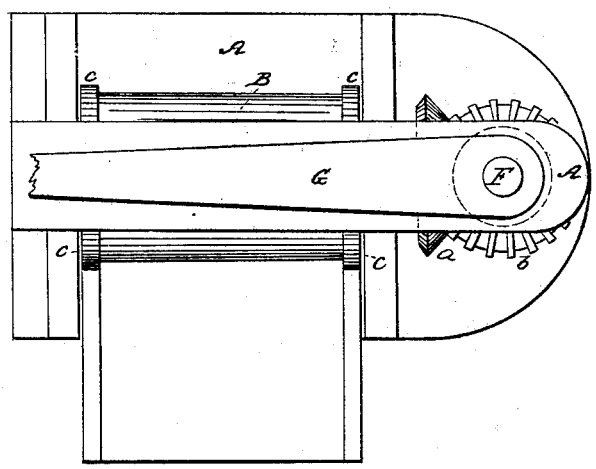
Witnesses:  Inventor:

UNITED STATES PATENT OFFICE.

G. H. NYE, OF MONMOUTH, ILLINOIS.

DEVICE FOR PREPARING HAY FOR BALING.

Specification forming part of Letters Patent No. 45,853, dated January 10, 1865.

*To all whom it may concern:*

Be it known that I, G. H. NYE, of Monmouth, county of Warren, and State of Illinois, have invented a Machine for Preparing Hay, &c., for Baling; and I do hereby declare that the following is a full, clear, and exact description thereof, reference being had to the accompanying drawings, making a part of this specification, in which—

Figure 1 is a side elevation of one side of my machine. Fig. 2 is a vertical transverse section through the machine. Fig. 3 is a top view.

Similar letters of reference indicate corresponding parts in the three figures.

This invention relates to a new machine, which is intended for crushing the stalks of hay and straw preparatory to compressing and baling the same, so that when the material is thus prepared it can be pressed more compactly than hitherto.

To enable others skilled in the art to make and use my invention, I will describe its construction and operation.

In the accompanying drawings, A represents a very strong frame, which is adapted for receiving and supporting two horizontal crushing-rollers, B C, between which the material to be reduced is passed. The shafts D E of these rollers or crushers have their bearings in the upright standards of the frame A, and from one side of one of said standards the ends of the roller-shafts project, and carry beveled spur-wheels *a a*, which engage with the teeth of corresponding spur-wheels, *b b*, which are keyed to the vertical driving-shaft F, as shown in Fig. 1.

The driving-shaft F may have a sweep, G, applied on either its upper or its lower end, by means of which the prime mover can be made to operate the machine; or, if desirable, other mechanical contrivances may be employed to give motion to the crushing-rollers.

The rollers B C may be mounted in adjustable bearings, if desired, although I prefer to have stationary bearings, which will not yield.

It will be seen by reference to Figs. 1 and 2 that the two rollers B C have flanges *c c* projecting from their surfaces near their ends, the surfaces of which flanges touch each other as the rollers are turned. This leaves a space between the crushing-surfaces of these rollers, which should not be so wide as to allow the material to pass between the rollers without being properly crushed, nor so narrow as to render the operation of the machine very slow. These flanges *c c* are intended for preventing the stalks of hay or straw from escaping at the ends of the rollers, and also for preventing the material passing between the rollers from spreading too much, and thus escaping unbroken.

As the material is passed between the rollers and crushed, it is also cut into short lengths by means of two longitudinal knives, *g g*, which are secured to the rollers B C in such manner that as these knives are brought near each other by the rotation of their respective rollers they will sever the crushed material and allow it to escape from the machine in compact layers, the length and width of which will depend upon the diameters of the rollers, and also the length or distance between the flanges thereof.

By means of a machine constructed upon the principles above described the loose hay or straw can be broken or crushed previously to its being subjected to the press, so that a very large quantity of hay can thus be pressed into a very compact and portable bale. The flanges at the ends of the rollers are intended to prevent the material from spreading out laterally, and by thus confining it the crushed hay will leave the machine in layers of a uniform thickness and compactness.

Having thus described my invention, what I claim as new, and desire to secure by Letters Patent, is—

1. The rollers B C, when provided with flanges *c c*, substantially as and for the purpose herein specified.

2. The combination of flanged crushing-rollers B C with the knives *g g*, substantially as and for the purpose set forth.

G. H. NYE.

Witnesses:
WM. F. DAVIS,
WM. H. RANKIN.